Sept. 30, 1969 P. I. BONYHARD 3,470,545

THIN FILM MEMORY CONSTRUCTION HAVING MAGNETIC KEEPER PLATES

Filed Sept. 8, 1966

INVENTOR
P.I. BONYHARD
BY
William H. Kamstra
ATTORNEY

United States Patent Office 3,470,545
Patented Sept. 30, 1969

3,470,545

THIN FILM MEMORY CONSTRUCTION HAVING MAGNETIC KEEPER PLATES

Peter I. Bonyhard, Newark, N.J., assignor to Bell Telephone Laboratories, Incorporated, Murray Hill and Berkeley Heights, N.J., a corporation of New York Filed Sept. 8, 1966, Ser. No. 578,010
Int. Cl. G11c *11/14*
U.S. Cl. 340—174 11 Claims

ABSTRACT OF THE DISCLOSURE

A plated wire magnetic memory element is arranged to bridge apertures in a magnetic keeper sheet lying in the same plane. Drive strap solenoids extend through respective ones of the apertures on one side of the element and return on the other side so that the memory element provides a flux path closure at each aperture for flux paths around parts of the perimeter of the aperture and encircling the solenoid. The aperture width and strap width define the bounds of each memory address along the element so that there is substantially uniform flux distribution through the element within those bounds. A memory array is formed by stacking planes of elements and their associated magnetic sheets with solenoids extending through the stack.

Figure 2:
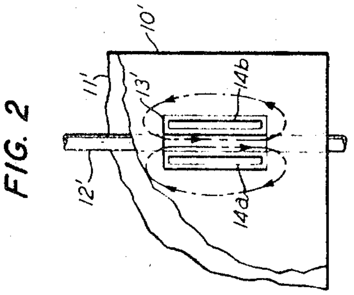

This invention relates to magnetic memory assemblies and particularly to such assemblies in which high permeability magnetic sheets are adapted to provide low reluctance flux paths for drive fields applied to magnetic storage elements.

Magnetic memory arrangements in which binary information is stored in a magnetic memory element as a particular remanent flux state are well known in the art. When such memory elements take the form of a thin magnetic film having a uniaxial anisotropy, the remanent flux is present in the element in one or the other direction along its easy axis of magnetization. Such an element is interrogated by applying a read field substantially at right angles to the easy axis of magnetization to cause its rotation toward the hard axis. An output signal generated by the flux rotation in an electrical conductor coupled to the thin film is indicative of the particular binary digit stored in the memory element. As described in a copending application of the present inventor, Ser. No. 578,758 filed Sept. 12, 1966, a tipping field may be applied to the memory element during the termination of the read field either to restore the memory element to its original flux state or to switch the magnetization to the other direction along its easy axis when the binary digit is to be changed.

The present invention is particularly concerned with increasing the effectiveness of the aforementioned read field or, conversely, obtaining the same magnetic drive with a lesser read field. In the copending application above referred to, a thin film magnetic element in the form of a cylindrical film affixed to an electrically conducting substrate was described. The uniaxial anisotropy of such an element is in the example presently considered such that the hard direction of magnetization of the film lies along the longitudinal axis of the conductor substrate and the easy axis lies circumferentially about the latter axis. A binary digit is then represented in the element by a clockwise or counterclockwise magnetization around the easy axis. The read field is applied during interrogation via a solenoid coupled transversely to the cylindrical memory element. The magnetization is thus rotated toward the hard axis to induce an information-representative output signal on the conductor substrate.

In prior art cylindrical thin film magnetic memory arrangements, when the read field is applied, the remanent magnetization is caused to rotate through different angles at different points along the element within the defined bit storage address segment. This lack of uniform rotation gives rise to free magnetic poles which in turn cause stray fields, either magnetizing or demagnetizing. The effects of these stray fields are twofold. The rotation of the magnetization directly under the drive solenoid is retarded where in fact a full 90° rotation is required. This results in an increase in the magnitude of the drive currents on the solenoid required to achieve full rotation. Also, the rotation of magnetization at points some distance from the immediate address area of the film is enhanced by the stray fields. In the absence of the stray fields, the read field generated by the solenoid alone would have been insufficient to produce appreciable rotation at these points. As a result, bit-to-bit interaction occurs through the domain wall creep phenomenon.

It is to be understood that in the example discussed here the magnetic film covers the complete surface of the cylindrical substrate continuously and without breaks. The magnetic film therefore forms a continuity with respect to all the memory bits along the same conducting substrate.

Conventionally, in an attempt to minimize the foregoing problems, a high permeability sheet of a magnetic material such as permalloy is positioned on one or both sides of the solenoid. Such a sheet or "keeper," by providing a low reluctance path for the read drive field, concentrates it at the defined bit address on the cylindrical film and reduces the air gap. Both of the foregoing effects are, as a result, reduced. However, in a conventional prior art construction, a substantial air gap between the keeper sheet and the memory element film remains.

Accordingly, it is one object of this invention to provide an improved magnetic memory assembly which permits an ultimate reduction in the air gap between a keeper sheet and the information storage element.

It is another object of this invention to enhance the effect of the drive fields applied to a thin film magnetic memory element.

It is also an object of this invention to achieve a better definition of an address segment length by its coupled solenoid on a thin film memory element.

The foregoing and other objects of this invention are realized in one specific illustrative memory assembly in which a magnetic keeper sheet is positioned immediately adjacent, and in the same plane as, the magnetic thin film memory elements, without the interposition of the drive solenoids. At a bit address on the thin film, the keeper sheet is apertured to permit the passage therethrough of the solenoid which thus lies in a plane at right angles to that of the sheet. In a large array of thin film memory elements, the solenoids pass through the keeper sheets via the bit address apertures. The assembly of this invention thus requires no changes in the normal access operations of the memory.

Manifestly, in the assembly briefly described in the foregoing, the keeper sheet or sheets may be positioned as close to the memory elements as a regard for the electrical insulation of the assembly permits. Similarly, the apertures of the keeper sheet may be so dimensioned that the most effective use is made of its low reluctance path in influencing the field generated by the solenoid passing therethrough. Advantageously, according to this invention, the normal relationship of a memory element and its coupled solenoid is maintained while at the same time permitting the closest possible coupling to both of the keeper sheets. It is thus a feature of this invention that, instead of lying in a plane parallel to the planes of the memory elements and the coupled solenoids, a keeper sheet or sheets lie in a plane at right angles to the planes of the solenoids and parallel to the plane of the memory elements, the solenoids passing through apertures in the sheets provided therefor.

Figure 1:
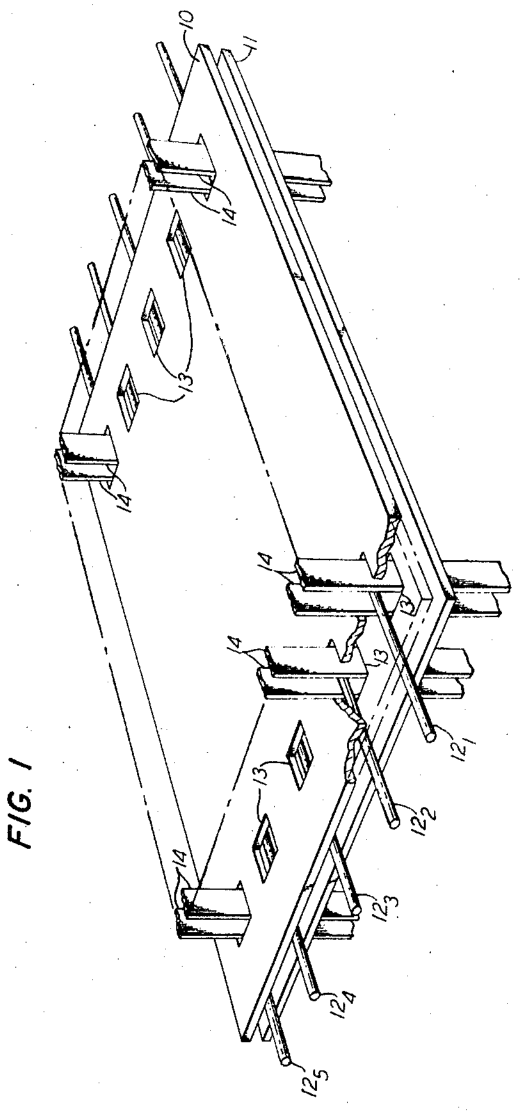

The foregoing and other objects and features of this invention will be better understood from a consideration of the detailed description of the organization and operation of one specific illustrative memory assembly according to this invention which follows when taken in conjunction with the accompanying drawing in which:

FIG. 1 depicts a single planar array of cylindrical thin film memory addresses in an assembly according to this invention showing only two solenoid portions for simplicity and further showing one of the keeper sheets broken away better to illustrate the relationship of the elements; and FIG. 2 depicts in simplified form the plan view of a corner portion of the array of FIG. 1 including a single magnetic storage address according to this invention.

The assembly of FIG. 1 comprises a pair of keeper sheets 10 and 11 which sandwich therebetween a plurality of cylindrical thin film memory elements $12_1$ through $12_5$. The elements 12 are of a character well known in the art and may comprise, for example, a conductive wire substrate having affixed on the surface thereof a magnetic thin film. As is also known, the magnetic film has uniaxial anisotropy established therein with the result that each of the elements 12 has an easy direction of magnetization which is circumferential about its longitudinal axis and a hard direction of magnetization which is parallel to the longitudinal axis. Each of the sheets 10 and 11 is of a magnetic, high permeability material such as, for example, ones known commercially as Permalloy or Mumetal. A coordinate array of apertures 13 is formed in each of the sheets 10 and 11 in rows and columns, only the first and last representative rows of apertures being shown in the drawing. The apertures 13 are arranged so that corresponding apertures of the sheets are in registration and are also so aligned with respect to the memory elements 12 that each of the latter pass substantially centrally beneath a column of apertures. As will appear hereinafter, the apertures thus aligned define rows and columns of bit storage addresses on the parallel grouping of memory elements 12. At each of the bit addresses, flat strip, electrically conductive solenoids 14 pass through the apertures 13 substantially at right angles to the planes of the sheets 10 and 11. In FIG. 1, two portions of each of the solenoids 14 are shown passing along either side of the memory elements $12_1$ and $12_2$ to achieve magnetic coupling therewith. Only portions of the solenoids 14 are shown for simplicity; however, it is to be understood that the solenoid portions 14 in practice are extended in both directions to pass through apertures of keeper sheets of the memory planes, not shown, on either side of the assembly shown in FIG. 1. Only representative solenoids 14 are shown in the drawing although it will be appreciated that each of the apertures 13 of the coordinate array of apertures represented in FIG. 1 has solenoids 14 passing therethrough. At the last planar assembly of a memory stack, the solenoid portions 14 are conventionally connected together so that a current may be applied to one portion, which current returns in the opposite direction in the other portion. The magnetic fields generated by the solenoid portions as a result are applied in the same direction to the bit address segments along the hard axis of magnetization of a memory element.

When the elements 12, solenoids 14, and sheets 10 and 11 are suitably electrically insulated from each other, it is clear that the magnetic coupling of the various components may be as close as ease of fabrication permits and air gaps thereby effectively eliminated. The concentration of magnetic fields generated by a solenoid by the apertured keeper arrangement of this invention at a bit storage address segment may be seen from the storage address depicted in FIG. 2. A corner portion of the planar array of FIG. 1 is there shown which comprises a broken corner of an upper keeper sheet 10' and lower keeper sheet 11' sandwiching therebetween a portion of a memory element 12'. The sheet portion 10' has formed therein at the bit address defined on the memory element 12' an aperture 13'. A similar aperture, not visible in the figures, is provided in the lower sheet 11' which latter aperture is in registration with the aperture 13'. The solenoid portions **14*a* and 14*b* are shown in end view and are understood to comprise the respective portions of the solenoid in inductive coupling about the memory element 12'**.

Assuming a current is applied to the portion **14*a* of the solenoid from a source not shown in the drawing, which current returns via the portion 14*b* in the opposite direction, the magnetic fields so generated are presented with a low reluctance closure path at every point about the address segment of the memory element 12' in the keeper sheets 10' and 11'. Assuming that the sheets 10' and 11' are separated from the memory element 12'** only by thin layers of electrical insulation, it is clear that only small parts of the fields are dissipated by the high reluctance of an air gap. Further, because of the concentration of the fields in the keeper sheets, the buffer regions adjacent the address segment defined by the solenoid portions have little if any of the fields applied thereto. Advantageously, an improved isolation of the bit address is achieved.

The improved definition of a bit address segment on a thin film element also reduces the tendency to set increasingly hard a bit address as the result of repeated interrogations. As discussed in the copending application referred to hereinbefore, as the drive field reaches further into the buffer regions separating the bit addresses on a memory element during repeated interrogations and rewritings, variations in the output signals generated during subsequent interrogations are encountered. With the drive field limited to the immediate area of the address segment in the assembly of this invention, a greater uniformity of output signals is also achieved.

Although the exact manner in which a write operation is achieved in an assembly according to this invention is here only of incidental interest, it will be understood that a tipping current applied to the conductive substrate of the element 12' of FIG. 2 and elements 12 of FIG. 1 before the termination of the read drive field described in the foregoing either returns the magnetization in an interrogated address segment to its original state or switches it to a new direction along the easy axis of the memory element. This rewrite operation depends on the direction of the tipping current and whether the stored information is to be restored to the address segment or is to be changed. This rewrite operation is discussed in detail in the copending application referred to in the foregoing.

What has been described is considered to be only one specific illustrative memory assembly according to the principles of this invention. Accordingly, it is to be understood that various and numerous other arrangements may be devised by one skilled in the art without departing from the spirit and scope of this invention as defined by the accompanying claims.

What is claimed is:

1. A magnetic memory assembly comprising at least one thin film magnetic memory element lying in a first plane, at least one magnetic keeper sheet lying in a plane parallel to said first plane having a slotted aperture therein intersecting said memory element, and an electrical conductor lying in a second plane transverse to said first plane passing through said aperture and being coupled to said memory element to define an information storage address thereon.

2. A magnetic memory assembly comprising a plurality of elongated thin film magnetic memory elements parallelly arranged in a first plane, a magnetic keeper sheet lying in a plane parallel to said first plane having a plurality of apertures therein in registration with said plurality of elongated memory elements, and a plurality of electrical conducting means lying in planes at substantially right angles to said first plane, said plurality of conducting means passing through said apertures and being coupled to said memory elements to define a plurality of information storage addresses thereon.

3. A magnetic memory assembly as claimed in claim 2 in which said plurality of electrical conducting means each comprises a flat strip conductor passing through one of said apertures on one side of a memory element and returning through said same aperture on the other side of the same memory element.

4. A magnetic memory assembly as claimed in claim 3 in which said memory elements each comprises an electrically conductive wire having a magnetic thin film affixed to the surface thereof.

5. A magnetic memory assembly comprising an elongated magnetic memory element, an electrical conducting means coupled to said magnetic memory element and defining an information storage address thereon, and a high permeability magnetic keeper sheet having an aperture therein, said sheet lying in the same plane as said memory element and said electrical conducting means passing through said sheet at substantially right angles.

6. A magnetic memory assembly comprising an elongated magnetic memory element, a plurality of electrical conducting means coupled to said magnetic memory element at predetermined intervals and defining a plurality of information storage addresses thereon, and a high permeability magnetic keeper sheet having a plurality of apertures therein in registration with said plurality of conducting means, said sheet lying in the same plane as said memory elements and said plurality of electrical conducting means passing through said sheet at substantially right angles.

7. A magnetic memory assembly as claimed in claim 6 in which said elongated magnetic memory element comprises a cylindrical thin film affixed to the surface of an electrically conductive substrate and said plurality of electrical conducting means each comprises a flat strip solenoid passing through an aperture in one direction on one side of said thin film, returning through the same aperture in the opposite direction on the other side of the same thin film.

8. A magnetic memory assembly comprising a plurality of elongated thin film magnetic memory elements parallelly arranged in a first plane, a first magnetic keeper sheet lying adjacent one side of said plurality of memory elements and in a plane parallel to said first plane, said first magnetic sheet having rows and columns of apertures therein, said columns of apertures being in registration with said plurality of memory elements, a second magnetic keeper sheet lying adjacent the other side of said plurality of memory elements and also in a plane parallel to said first plane, said second magnetic sheet also having rows and columns of apertures therein in registration with said apertures of said first magnetic sheet, and a plurality of electrical conducting means lying in planes at substantially right angles to said first plane, said plurality of conducting means passing through said apertures of said first and second sheets in registration and being coupled to said memory elements to define a plurality of information storage addresses thereon, each said aperture defining at the perimeter thereof a first flux path around said conductor means therein, the one of said addresses at such aperture forming with a part of said perimeter a second and shorter flux path around such conducting means.

9. In a magnetic memory assembly, a plurality of memory planes, each of said planes comprising a plurality of elongated thin film magnetic memory elements parallelly arranged, at least one magnetic keeper sheet lying adjacent said plurality of elongated memory elements, and a plurality of electrical conducting means coupled to said memory elements and defining a plurality of information storage addresses thereon, the last-mentioned conducting means lying at substantially right angles to said magnetic sheet and passing from plane to plane of said memory through apertures formed in said sheet, each said aperture defining at the perimeter thereof a first flux path around said conducting means therein, the one of said addresses at such aperture forming with a part of said perimeter a second and shorter flux path around such conducting means.

10. In a magnetic memory assembly as claimed in claim 9, each of said plurality of electrical conducting means comprising a flat strip conductor passing through successive apertures of the magnetic sheets of said planes in one direction on one side of successive memory elements and returning through the same apertures in the opposite direction on the other side of the same memory elements.

11. In a magnetic memory assembly as claimed in claim 10, in which each of said memory elements comprises a cylindrical thin film affixed to the surface of an electrically conductive wire substrate.

References Cited

UNITED STATES PATENTS

| | | | |
|---|---|---|---|
| 3,069,661 | 12/1962 | Gianola | 340—174 |
| 3,083,353 | 3/1963 | Bobeck | 340—174 |
| 3,259,888 | 7/1966 | Cornely et al. | 340—174 |
| 3,317,742 | 5/1967 | Guerth | 307—88 |
| 3,349,382 | 10/1967 | Naylor et al. | 340—174.1 |
| 3,245,057 | 4/1966 | Downing | 340—174 |
| 3,341,830 | 9/1967 | Conrath | 340—174 |

OTHER REFERENCES

IBM Technical Disclosure Bulletin: "Memory Device Using Anisotropic Metal Keeper," by Anacker, vol. 8, No. 11, April 1966 (copy in 340–174 Keeper).

IBM Technical Disclosure Bulletin: "Metallic Keeper for Closed-Easy-Axis Memory Devices," by Chang et al., vol. 8, No. 12, May 1966 (copy in 340–174 Keeper).

STANLEY M. URYNOWICZ, Jr., Primary Examiner